(12) United States Patent
Lin et al.

(10) Patent No.: US 10,794,552 B2
(45) Date of Patent: Oct. 6, 2020

(54) ILLUMINATING FLEXIBLE FLAT CABLE

(71) Applicant: DAYU OPTOELECTRONICS CO., LTD., Taoyuan (TW)

(72) Inventors: Shiu-Siou Lin, Taoyuan (TW); Yu-Chieh Chen, Taoyuan (TW)

(73) Assignee: DAYU OPTOELECTRONICS CO., LTD., Taoyuan (TW)

( * ) Notice: Subject to any disclaimer, the term of this patent is extended or adjusted under 35 U.S.C. 154(b) by 0 days.

(21) Appl. No.: 16/517,650

(22) Filed: Jul. 21, 2019

(65) Prior Publication Data

US 2020/0096164 A1 Mar. 26, 2020

(30) Foreign Application Priority Data

Sep. 20, 2018 (TW) .............................. 107212856 U

(51) Int. Cl.
| | |
|---|---|
| *F21S 4/24* | (2016.01) |
| *G02B 6/42* | (2006.01) |
| *H01B 9/00* | (2006.01) |
| *F21V 8/00* | (2006.01) |
| *H01B 7/04* | (2006.01) |

(52) U.S. Cl.
CPC ................ *F21S 4/24* (2016.01); *G02B 6/001* (2013.01); *G02B 6/0068* (2013.01); *G02B 6/4293* (2013.01); *H01B 9/005* (2013.01); *G02B 6/0083* (2013.01); *G02B 6/4281* (2013.01); *H01B 7/04* (2013.01)

(58) Field of Classification Search
None
See application file for complete search history.

(56) References Cited

U.S. PATENT DOCUMENTS

| | | | |
|---|---|---|---|
| 10,050,390 B1 * | 8/2018 | Lin ...................... | H01R 13/502 |
| 10,069,252 B1 * | 9/2018 | Lin ...................... | G02B 6/0005 |
| 2005/0089284 A1 * | 4/2005 | Ma ........................ | G02B 6/001 |
| | | | 385/101 |
| 2005/0184738 A1 * | 8/2005 | Weaver ................ | G01R 31/008 |
| | | | 324/541 |

(Continued)

*Primary Examiner* — Jerry Rahll
(74) *Attorney, Agent, or Firm* — Raymond Y. Chan; David and Raymond Patent Firm

(57) ABSTRACT

An illuminating flexible flat cable includes a plurality of first cables, a plurality of light sources and a first controller. Each of the first cable includes an electric conductive member and a light guiding member and the electric conductive member is coated and covered by the light guiding member. One of the first cables is a power first cable, and the electric conductive member of the power first cable is adapted for being electrically connected with a first power source, while the light sources are arranged corresponding to the first cables. The light emitted by each of the light sources is guided into the cables and transmitted in the light guiding members. However, at least a portion of the light can penetrate the light guiding members. The first controller is electrically connected with the light sources to control the light sources to emit the light. The first controller is also electrically connected with the electric conductive members of the power first cables so that the electric conductive members enable the first power source to provide electrical power for the first controller and the light sources.

18 Claims, 7 Drawing Sheets

(56) References Cited

U.S. PATENT DOCUMENTS

| | | | |
|---|---|---|---|
| 2015/0003794 A1* | 1/2015 | Elsaadani | G02B 6/4416 |
| | | | 385/101 |
| 2015/0310964 A1* | 10/2015 | Larson | G02B 6/4495 |
| | | | 174/71 R |
| 2018/0108454 A1* | 4/2018 | Shen | H01B 11/22 |
| 2018/0348459 A1* | 12/2018 | Marrapode | H01B 11/00 |
| 2019/0331864 A1* | 10/2019 | Shenai | G02B 6/3895 |

* cited by examiner

ILLUMINATING FLEXIBLE FLAT CABLE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a flat cable, and, in particular, to a illuminating flexible flat cable that is capable of illuminating and/or shining.

Description of Related Arts

Recently, the eSports industry has developed rapidly. Not only the eSports software providers are promising, but also the eSports hardware suppliers are booming and contending. Nevertheless, it demands not only faster processing speed for the core of the hardware, but also newer looks and stylings of the hardware to hopefully create products that can attract more attention from the consumers.

The manufacturers have racked their brains in order to create products with better texture and characteristic exterior to go with the fashionable lighting of the peripherals to create a high tech and impressive visual perception. In such cases, gorgeous luminous elements are the components that hardware designers commonly utilize. Luminous elements have so far been utilized in common eSports peripherals, such as mouse, mousepad, keyboard, computer case, motherboard, display card, memory, and etc.

SUMMARY OF THE PRESENT INVENTION

Accordingly, the present invention provides a new eSports stylish component so as to enrich the visual perception and provide more choices for the design of eSports computers. The present invention integrates illumination device and controlling unit with power cable module connectors for motherboard or display card. It covers a layer of light guide material (such as fiber optics and etc.) on the electric wire part and has the power cable module corresponded to the LED controller of the computer suppliers or utilizes built-in lighting modes directly to provide impressive and fashionable lighting variation.

The illuminating flexible flat cable according to an embodiment of the present invention includes a plurality of first cables, a plurality of light sources and a first controller. Each of the first cables includes an electric conductive member and a light guiding member, wherein the electric conductive member is coated and covered by the light guiding member. One of the first cables is a power first cable, and the electric conductive member of the power first cable is adapted for being electrically connected with a first power source, while one of the first cables is a grounding first cable. The light sources are arranged corresponding to the first cables. The light emitted by each of the light sources is guided into the first cables is transmitted in the light guiding members. However, at least a portion of the light can penetrate the light guiding members. The first controller is electrically connected with the light sources to control the light sources to emit the light. The first controller is also electrically connected with the electric conductive members of the power first cable and the grounding first cable, so as to allow the first power source to provide electrical power for the first controller and the light sources.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
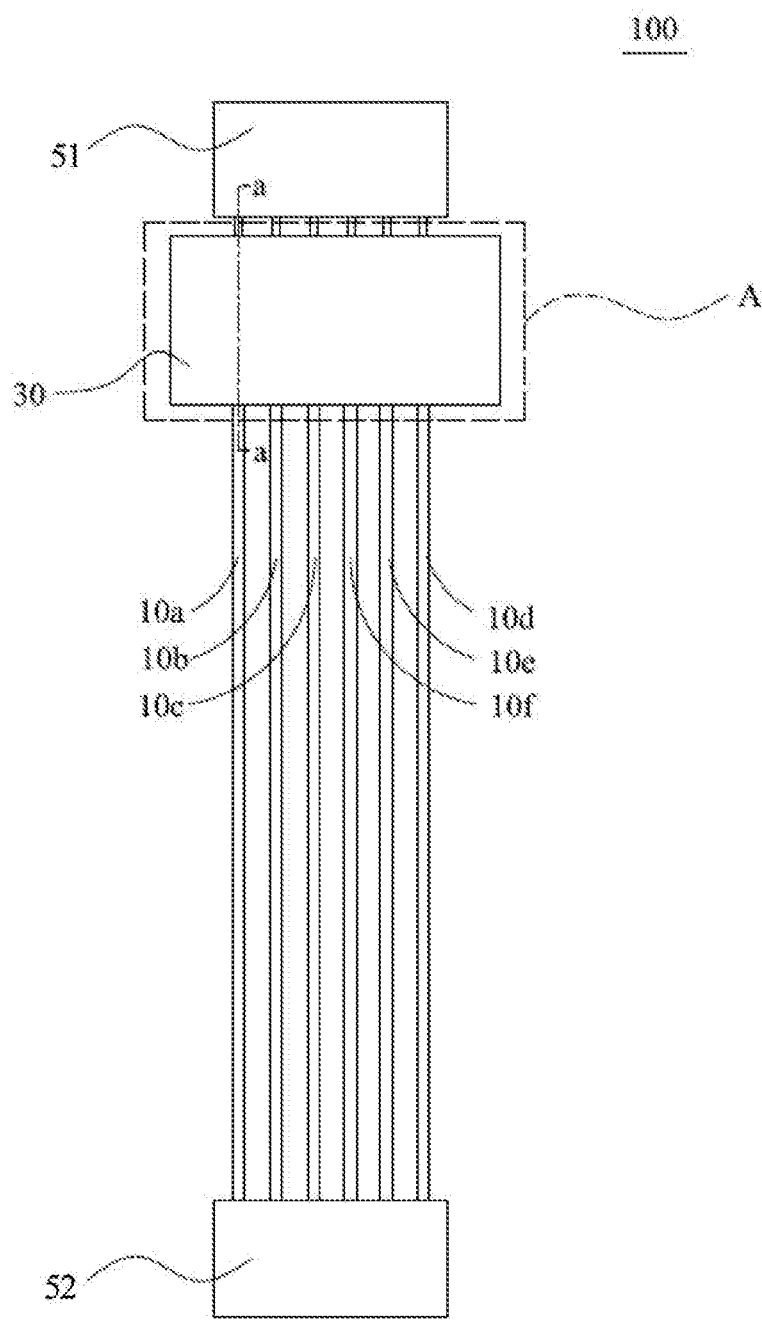
FIG. 1 is a perspective view of an illuminating flexible flat cable according to a preferred embodiment of the present invention.
Figure 2:
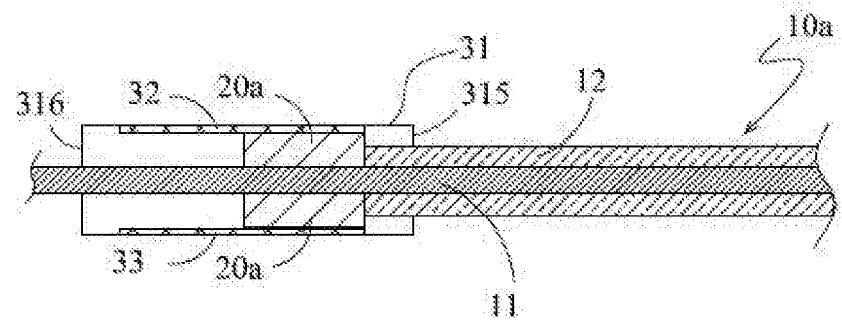
FIG. 2 is a sectional view of FIG. 1, sectioned along the a-a line.
Figure 3:
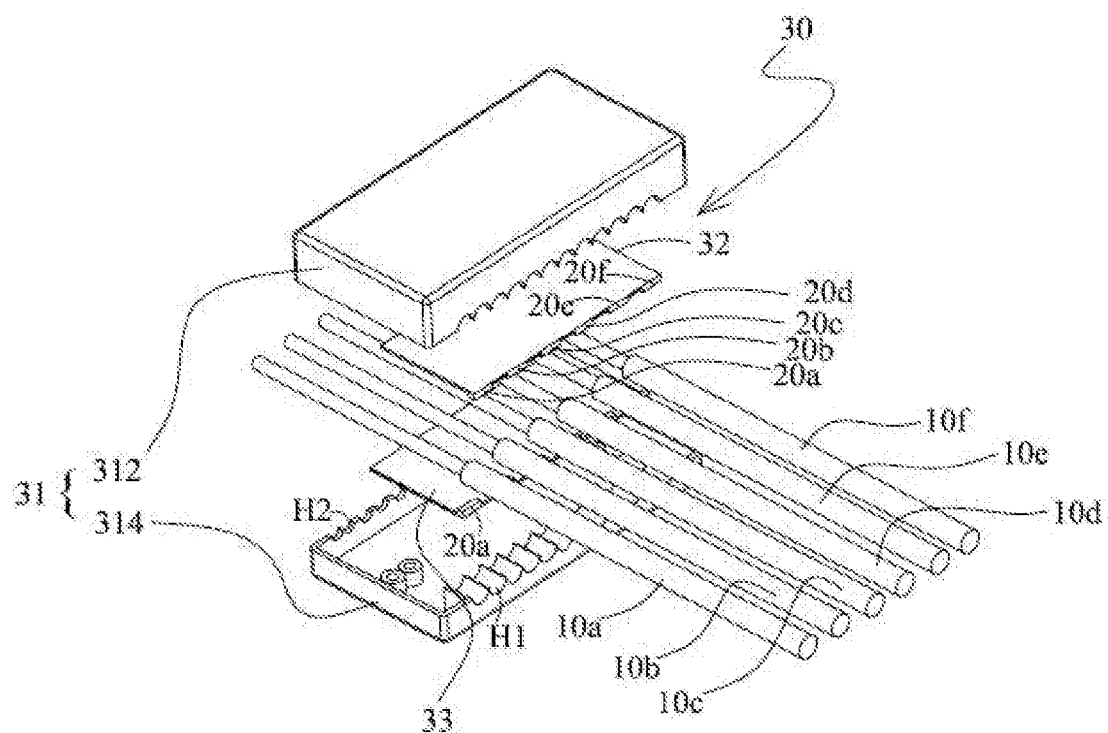
FIG. 3 is an exploded view of the portion A of FIG. 1.

Referring to FIGS. 1, 2 and 3, an illuminating flexible flat cable according to a preferred embodiment of the present invention is illustrated. The illuminating flexible flat cable according to the present invention includes a plurality of first cables 10a, 10b, 10c, 10d, 10e, and 10f, a plurality of light sources 20a, 20b, 20c, 20d, 20e, and 20f, and a first controller 30. The first cables 10a, 10b, 10c, 10d, 10e, and 10f are arranged in a parallel manner. Each of the first cables 10a, 10b, 10c, 10d, 10e, and 10f comprises an electric conductive member 11 and a light guiding member 12 covering the electric conductive member 11. According to the present embodiment, the electric conductive member 11 is made of metal material, such as soft drawn copper wire, silver-coated soft drawn copper wire, and etc. The light guiding member 12 can be made of a plastic light guide material, such as polycarbonate resin and etc. According to the present embodiment, the light guiding member 12 is made of electrical insulation material, so as to not only guide light, but also serve as the insulation covering material for the electric conductive member 11. According to another embodiment, it may first cover a layer of insulation material, such as polythene, polyvinyl chloride, and etc., on the exterior of the electric conductive member 11 and then cover the light guiding member 12 on the exterior of the insulation material.

One of the first cables 10a, 10b, 10c, 10d, 10e, and 10f is a power first cable. For example, if the first cable 10a is the power first cable, the electric conductive member 11 of the power first cable 10a can be adapted for being electrically connected with a first power source 40. According to the present embodiment, the first power source 40 can be embodied as a power supply unit of a computer. One of the first cables 10a, 10b, 10c, 10d, 10e, and 10f is a grounding first cable. For example, if the first cable 10b is the grounding first cable, the light sources 20a, 20b, 20c, 20d, 20e, and 20f can be arranged corresponding to the first cables 10a, 10b, 10c, 10d, 10e, and 10f respectively, such that light emitted by the light sources 20a, 20b, 20c, 20d, 20e, and 20f will be guided into the first cables 10a, 10b, 10c, 10d, 10e, and 10f and transmitted in the light guiding member 12, while portion of the light may pass through the light guiding member 12. The first controller 30 is electrically connected with the light sources 20a, 20b, 20c, 20d, 20e, and 20f to control the light sources 20a, 20b, 20c, 20d, 20e, and 20f to emit the light. The first controller 30 can be adapted for being electrically connected with the electric conductive member 11 of the power first cable 10a, so as to allow the first power source 40 to supply power for the first controller 30 and the light sources 20a, 20b, 20c, 20d, 20e, and 20f. Detail structure of the first controller 30 will be disclosed in the following.

The illuminating flexible flat cable of the present invention further comprises a first connector 51 and a second connector 52, respectively connected with two ends of the electric conductive member 11 of each of the first cables 10a, 10b, 10c, 10d, 10e, and 10f. Further, the electric conductive members 11 of the first cables 10a, 10b, 10c, 10d, 10e, and 10f are respectively connected to terminals of the first connector 51 and the terminal of the second connector 52.

Referring to FIGS. 2 and 3, the first controller 30 comprises a shell 31, a first circuit board 32 and a second circuit board 33. According to the present embodiment, the shell 31 comprises an upper portion 312 and a lower portion 314. The upper portion 312 and the lower portion 314 can be coupled by means of locking structure, such as screw or bolt, buckle, and etc., so as to form the shell 31. The shell 31 also has an accommodation space defined and formed therein for accommodating the first circuit board 32 and the second circuit board 33. Besides, the shell 31 has a plurality of through holes H1 and H2 respectively formed in opposite sides 315 and 316 thereof. The first cables 10a, 10b, 10c, 10d, 10e, and 10f are penetrated into the shell 31 through the through holes H1 respectively and the first cables 10a, 10b, 10c, 10d, 10e, and 10f are clamped and held by the upper portion 312 and the lower portion 314 of the shell 31. The light sources 20a, 20b, 20c, 20d, 20e, and 20f are arranged on the first circuit board 32 and the second circuit board 33. The first circuit board 32 and the second circuit board 33 are arranged in the shell 31. The connector 50 is arranged adjacent to the shell 31. Although the first and second circuit boards 32 and 33 are provided according to the present invention, the present invention shall not be limited accordingly. According to another embodiment, there may only be one circuit board.

Figure 4:
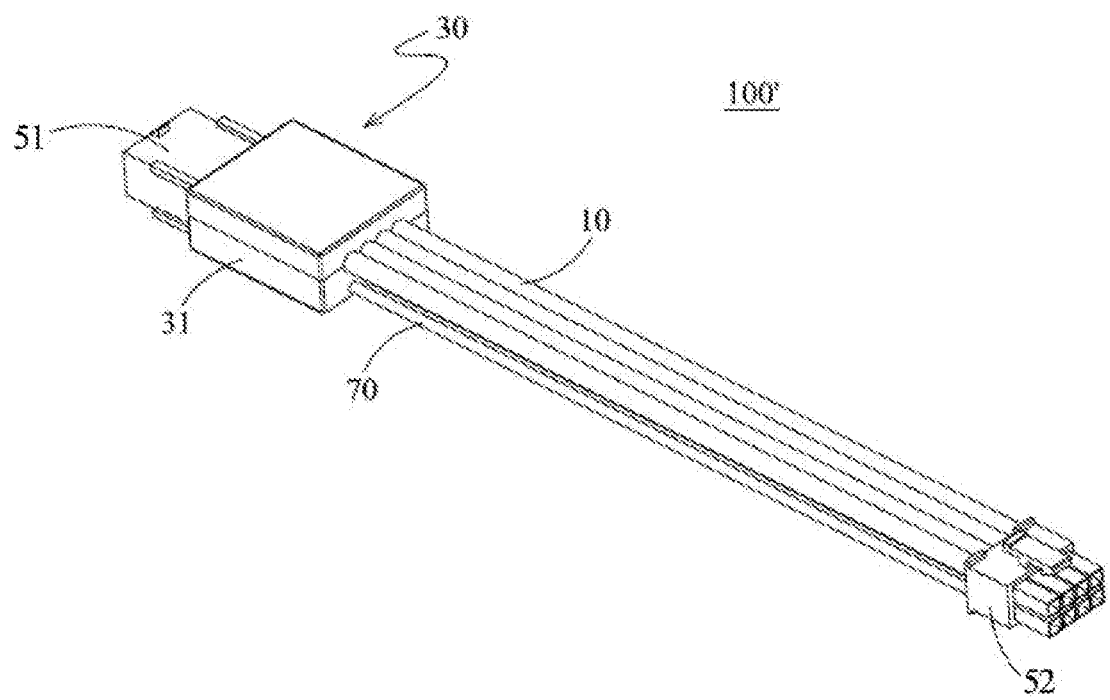
FIG. 4 is a perspective view of the illuminating flexible flat cable according to a first alternative mode of the above preferred embodiment of the present invention.
Figure 5:
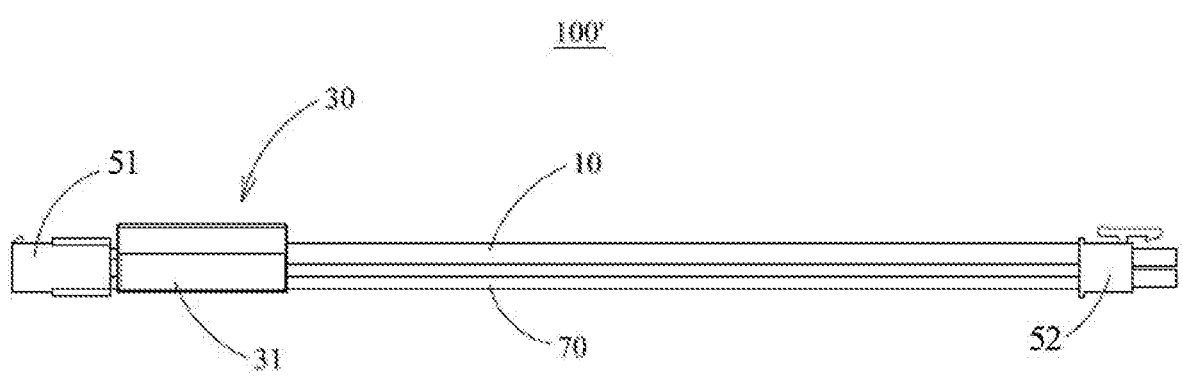
FIG. 5 is a front view of the illuminating flexible flat cable of FIG. 4.
Figure 6:
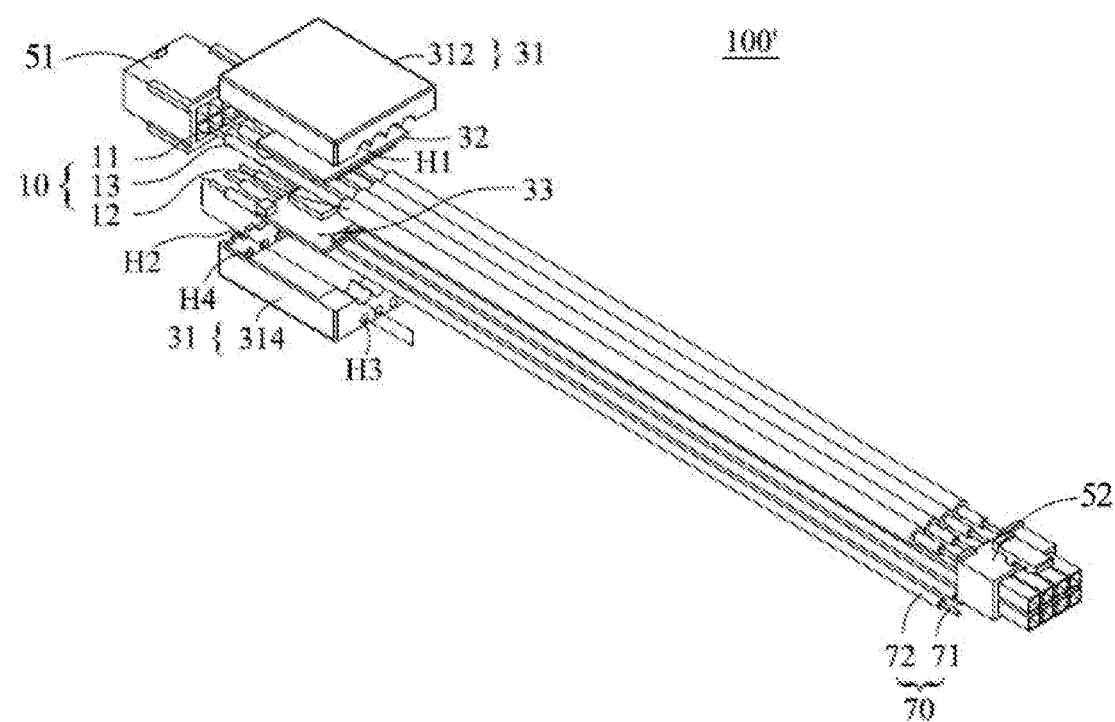
FIG. 6 is an exploded view of the illuminating flexible flat cable of FIG. 4.

Referring to FIGS. 4 5, and 6, an illuminating flexible flat cable according to a first alternative mode of the above preferred embodiment of the present invention is illustrated. According to the present embodiment, the illuminating flexible flat cable 100' of the present invention also comprises a plurality of second cables 70. Each of the second cables 70 comprises an electric conductive member 71 and an insulation member 72 covering on the electric conductive member 71. The second cables 70 are extended to pass through the shell 31 underneath the first and second circuit boards 32 and 33. The electric conductive members 71 of the second cables 70 are connected with at least a terminal of the connector 50. According to the present embodiment, the insulation member 72 is made of non-light-guide material. Besides the through holes H1 and H2, the shell 31 (including the upper portion 312 and the lower portion 314) further has through holes H3 and H4 arranged below the through holes H1 and H2 for the second cables 70 to pass through. The second cables 70 and the first cables 10 are arranged in a parallel manner. The first cables 10, besides the electric conductive members 11 and the light guiding members 12 of the first cables 10a, 10b, 10c, 10d, 10e, and 10f according to the above embodiment, further comprises an insulation member 13 arranged between the electric conductive member 11 and the light guiding member 12 each. Certainly, according to another embodiment, the first cables 10 may also have the same structure as the first cables 10a, 10b, 10c, 10d, 10e, and 10f of the above preferred embodiment do. Accordingly, the illuminating flexible flat cable according to the first alternative mode of the above preferred embodiment illuminates on only one side.

The light guiding members 12 of the first cables 10a, 10b, 10c, 10d, 10e, and 10f are extended into the shell 31 and arranged therein. Portion of each of the light guiding members 12 of the first cables 10a, 10b, 10c, 10d, 10e, and 10f is peeled off, so that at least a portion of the electric conductive members 12 is not covered by the respective light guiding member 12 in the shell 31. According to the present embodiment, the portions of the electric conductive members 12 that are not covered by the light guiding members 12 are clamped between the first and second circuit boards 32 and 33. The electric conductive members 12 are extended to pass through the shell 31 and connected with the terminal of the connector 50. Therefore, the bore diameter of the through holes H1 on the side 315 of the shell 31 is larger, so as for both the electric conductive members 11 and the light guiding members 12 to pass through. On the other hand, the bore diameter of the through holes H2 on the side 316 of the shell 31 is smaller, so as only for the electric conductive members 12 to pass through. The electric conductive members 12 extended from the shell 31 are inserted into the connector 50 and electrically connected with the terminal of the connector 50. The connector 50 can be plugged in an electronic device, such as a motherboard or a video card of a computer, and etc. The light sources 20a, 20b, 20c, 20d, 20e, and 20f are arranged next to the ends of the light guiding members 12, such that light emitted by the light sources 20a, 20b, 20c, 20d, 20e, and 20f can be projected into the light guiding members 12 directly.

The light sources 20a, 20b, 20c, 20d, 20e, and 20f can project light of the same color or different colors, based on the actual needs. According to the present embodiment, the light sources 20a, 20b, 20c, 20d, 20e, and 20f can be embodied as Light Emitting Diodes.

According to the present embodiment, because both the first and second circuit boards 32 and 33 have the light sources 20a, 20b, 20c, 20d, 20e, and 20f arranged thereon and are arranged on the two sides of the light guiding member 12, light sources for the light guiding member 12 of the same cable, for example, the light source 20a on the first circuit board 32 and the light source 20a on the second circuit board 33 may be the light sources that generate different colors of light. Such arrangement may be utilized as the flexible flat cable of a charging device. For instance, the light source on the first circuit board 32 may produce a red light when the charging device is charging; on the other hand, the light source on the second circuit board 33 may produce a blue light when the charging device finishes charging.

Besides, some multifunctional devices, such as various functional means, like drilling, blowing, watering, suctioning means, and etc., on dental therapeutic equipment, require a plurality of electric wires for connection. If the light sources 20a, 20b, 20c, 20d, 20e, and 20f can produce light of various colors, it allows the user to quickly understand which wire should be connected to which means.

In addition, many users must have encountered situations of informing if an electrical appliance is broken or there is no power supply. When one has an electrical appliance plugged in at an unfamiliar place and receives no response, he or she may firstly think that the electrical appliance is broken in most cases. However, it is also very possible that the socket has no power supply at all. The illuminating flexible flat cable 100 of the present invention is able to illuminate and/or shine when it is electrically powered, so as to give the user more clues regarding what's wrong when the electrical appliance has no response.

Figure 7:
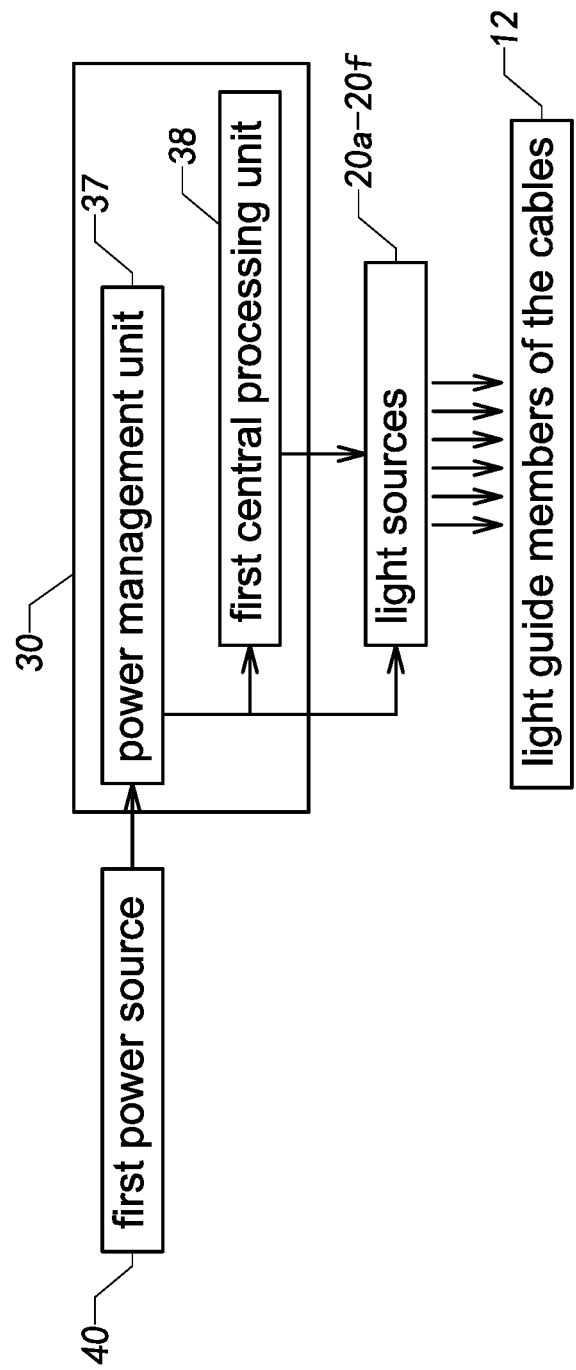
FIG. 7 is a block diagram of a illuminating flexible flat cable according to the above preferred embodiment of the present invention.

Referring to FIG. 7, the first controller 30 comprises a power management unit 37 and a first central processing unit 38. The power management unit 37 is electrically connected with the first power source 40, the first central processing unit 38 and the light sources 20a, 20b, 20c, 20d, 20e, and 20f. The first central processing unit 38 is also electrically connected with the light sources 20a, 20b, 20c, 20d, 20e, and 20f. The first power source 40 supplies electrical power for the first central processing unit 38 and the light sources 20a, 20b, 20c, 20d, 20e, and 20f through the power management unit 37. The first central processing unit 38 controls the illumination of the light sources 20a, 20b, 20c, 20d, 20e, and 20f. The power management unit 37 can be a power management integrated circuit arranged on the first circuit board 32 or the second circuit board 33, which main function is to control the quantity and direction of the current to meet the demands of the main system. The first central processing unit 38, based on a preset program, can control the illumination of the light sources 20a, 20b, 20c, 20d, 20e, and 20f, such as all lighting up, shimmering in a predetermined time interval, shining based on the order of the first cables 10a, 10b, 10c, 10d, 10e, and 10f.

Figure 8:
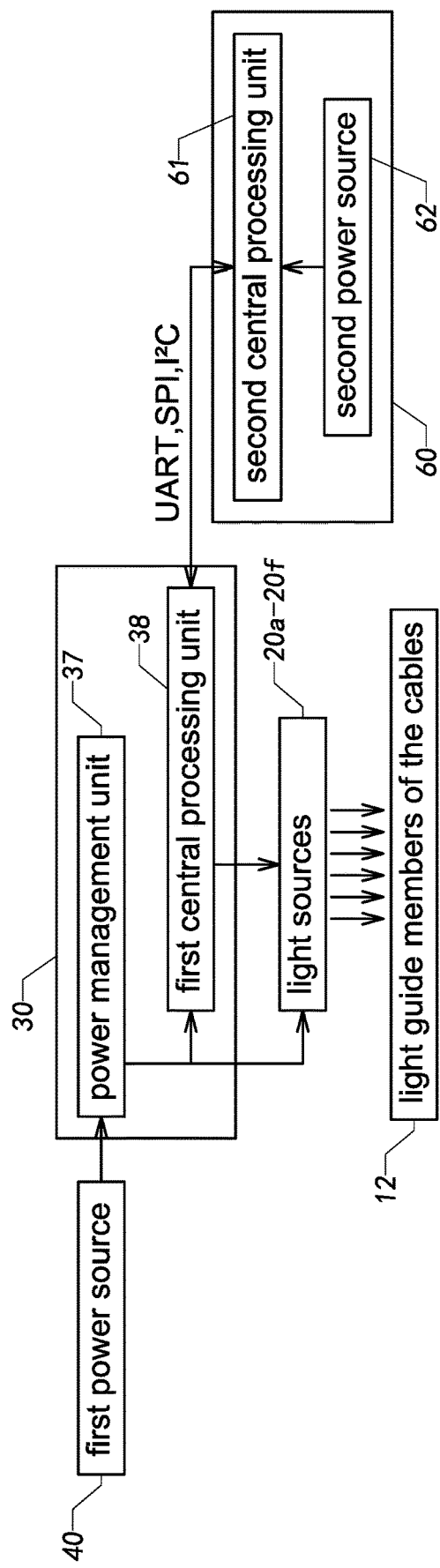
FIG. 8 is a block diagram of a illuminating flexible flat cable according to a second alternative mode of the above preferred embodiment of the present invention.
Figure 9:
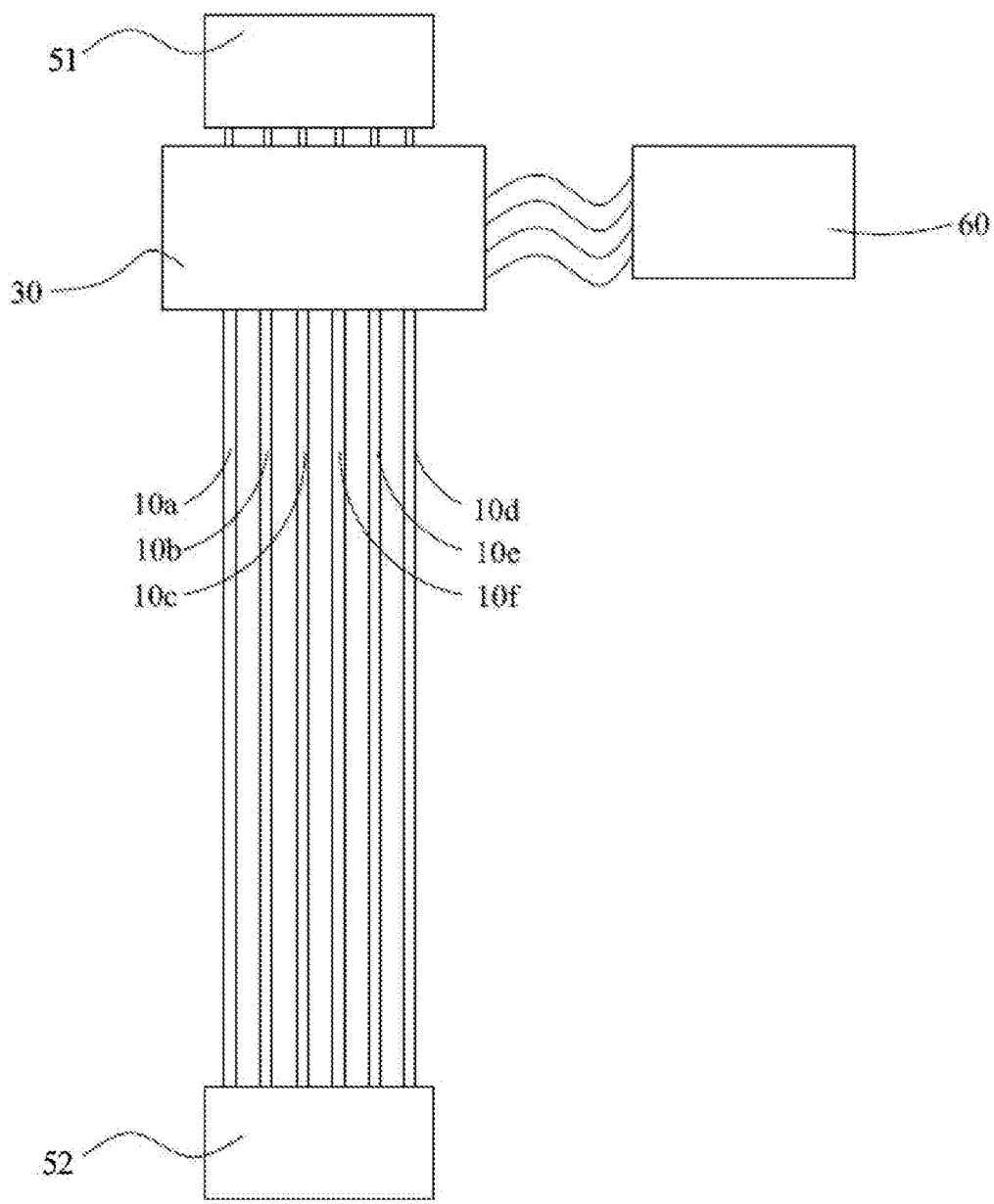
FIG. 9 is a perspective view of the illuminating flexible flat cable as shown in FIG. 8.

Referring to FIGS. 8 and 9, according to a second alternative mode of the above preferred embodiment, the illuminating flexible flat cable 100 of the present invention further comprises a second controller 60 electrically connected with the first controller 30 to control the illumination of the light sources 20a, 20b, 20c, 20d, 20e, and 20f through the first controller 30. Besides, the second controller 60 comprises a second central processing unit 61 and a second power source 62. The second central processing unit 61 is electrically connected with the first central processing unit 38. The second central processing unit 61 and the first central processing unit 38 can be connected through interfaces like UART (Universal Asynchronous Receiver Transmitter), SPI (Serial Peripheral Interface), I2C (Inter-Integrated Circuit), and etc., so as to allow the second central processing unit 61 to control the illumination of the light sources 20a, 20b, 20c, 20d, 20e, and 20f through the first central processing unit 38. In addition, the second power source 62 may supply power for the first controller 30 and the light sources 20a, 20b, 20c, 20d, 20e, and 20f through the second central processing unit 61. According to another embodiment, although the second central processing unit 61 controls the illumination of the light sources 20a, 20b, 20c, 20d, 20e, and 20f through the first central processing unit 38, it may directly utilize the first power source 40 to supply power for the light sources 20a, 20b, 20c, 20d, 20e, and 20f rather than utilize the second power source 70 to do so.

The illuminating flexible flat cable 100 of the present invention utilizes the light guiding members 12 to cover the electric conductive member 11 and provides the light sources 20a, 20b, 20c, 20d, 20e, and 20f at the ends of the light guiding members 12, so as to allow the light emitted by the light sources 20a-20f to enter the light guiding members 12 directly. The illuminating flexible flat cable 100 of the present invention can illuminate after it is electrically connected to a power supply. The light guiding member 12 of the illuminating flexible flat cable 100 of the present invention is pliable and flexible, so that the cables are relatively pliable and flexible. The illuminating flexible flat cable 100 of the present invention can utilize the built-in first controller 30 or the external second controller 60 to control the illumination of the light sources 20a, 20b, 20c, 20d, 20e, and 20f. Hence, it can flexibly utilize controllers provided by other suppliers to enable the illuminating flexible flat cable 100 of the present invention to produce various illumination modes, which provides a relatively great flexibility and diversity for the users.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An illuminating flexible flat cable, comprising:
    a plurality of first cables, wherein each of said first cables comprises an electric conductive member and a light guiding member covering said electric conductive member, wherein one of said first cables is power first cable and said electric conductive member of said power first cable is adapted for being electrically connected with a first power source;
    a plurality of light sources arranged corresponding to said plurality of first cables, wherein light emitted from said plurality of light sources is guided into said plurality of first cables and transmitted in said light guiding members while at least a portion of the light is projected through said light guiding members;
    a first controller electrically connected with said plurality of light sources to control light emission of said plurality of light sources, wherein said first controller is electrically connected with said electric conductive member of said power first cable adapted for utilizing the first power source to supply power for said first controller and said plurality of light sources;

a first connector coupled with one end of each of said first cables and arranged adjacent to said first controller; and a second connector coupled with another end of each of said first cables.

2. The illuminating flexible flat cable, as recited in claim 1, wherein said first controller comprises a shell and at least a first circuit board arranged in said shell, wherein said plurality of light sources is arranged on said first circuit board and said first connector is arranged adjacent to said shell.

3. The illuminating flexible flat cable, as recited in claim 2, wherein said light guiding members of said plurality of first cables are extended into said shell and said electric conductive members are extended to pass through said shell to be electrically connected with at least a terminal of said first connector, wherein at least a portion of each of said electric conductive members is not covered by said light guiding member in said shell.

4. The illuminating flexible flat cable, as recited in claim 3, further comprising a second circuit board, wherein portions of said electric conductive members uncovered by said light guiding members are arranged between said first and second circuit boards.

5. The illuminating flexible flat cable, as recited in claim 3, wherein said light sources are arranged adjacent to ends of said light guiding members.

6. The illuminating flexible flat cable, as recited in claim 2, further comprising a plurality of second cables, wherein each of said second cables comprises an electric conductive member and an insulation member covering said electric conductive member, wherein each of said plurality of second cables passes through said shell and said electric conductive members are electrically connected with at least a terminal of said first connector.

7. The illuminating flexible flat cable, as recited in claim 6, wherein said insulation member is made of non-light-guide material.

8. The illuminating flexible flat cable, as recited in claim 6, wherein at least one of said first cables is arranged to receive at least two of said light sources that emit light of different colors.

9. The illuminating flexible flat cable, as recited in claim 6, wherein each of said first cables further comprises an insulation member covering said electric conductive member and being covered by said light guiding member.

10. The illuminating flexible flat cable, as recited in claim 1, wherein at least two of said light sources emit light of different colors.

11. The illuminating flexible flat cable, as recited in claim 10, further comprising a second controller electrically connected with the first controller so as to control illumination of said plurality of light sources through said first controller.

12. The illuminating flexible flat cable, as recited in claim 1, wherein each of said first cables further comprises an insulation member covering said electric conductive member and being covered by said light guiding member.

13. The illuminating flexible flat cable, as recited in claim 1, wherein said first controller comprises a power management unit and a first central processing unit, wherein said power management unit is adapted for electrically connecting with the first power source, wherein said power management unit is electrically connected with said first central processing unit and said plurality of light sources, wherein said first central processing unit is electrically connected with said plurality of light sources while , wherein said first central processing unit and said plurality of light sources are adapted for being supplied with electrical power from the first power source under control by said said power management unit, wherein said first central processing unit controls illumination of said plurality of light sources.

14. The illuminating flexible flat cable, as recited in claim 1, further comprising a second controller electrically connected with said first controller so as to control illumination of said plurality of light sources through said first controller.

15. The illuminating flexible flat cable, as recited in claim 1, wherein the first power source is a power supply unit of a computer.

16. The illuminating flexible flat cable, as recited in claim 12, wherein said second controller further comprises a second central processing unit electrically connected with said first central processing unit so as to control illumination of said plurality of light sources through said first central processing unit.

17. The illuminating flexible flat cable, as recited in claim 12, wherein said first controller and said plurality of light sources are adapted for being supplied with electrical power from a second power source through said second controller.

18. The illuminating flexible flat cable, as recited in claim 1, wherein said light sources are LEDs.

* * * * *